United States Patent [19]
Kato et al.

[11] 3,843,227
[45] Oct. 22, 1974

[54] LIGHT DISSECTING OPTICAL SYSTEM

[75] Inventors: Jinichi Kato, Tokyo; Katsuji Rikukawa, Yokohama, both of Japan

[73] Assignee: Nippon Kogaku K.K., Tokyo, Japan

[22] Filed: Feb. 15, 1972

[21] Appl. No.: 226,546

Related U.S. Application Data

[63] Continuation of Ser. No. 6,436, Jan. 28, 1970, abandoned.

[30] Foreign Application Priority Data
Feb. 8, 1969 Japan.................................. 44-9005

[52] U.S. Cl...................... 350/33, 350/91, 356/120
[51] Int. Cl. .......................................... G02b 21/18
[58] Field of Search .................. 350/33, 25, 81, 91; 356/120, 156, 209

[56] References Cited
UNITED STATES PATENTS
1,873,149  8/1932  Perez................................... 350/91
3,062,099  11/1962  French................................. 350/25
3,542,482  11/1970  Wilks................................... 356/244
3,563,665  2/1971  Takahashi et al................... 356/120

Primary Examiner—David H. Rubin
Attorney, Agent, or Firm—Shapiro and Shapiro

[57] ABSTRACT

An optical system for a microscope for inspecting minute unevenness of a surface. Light reflecting members consisting of two pairs of mirrors or prisms are either fixed or movably disposed at the object side of the objective of a microscope having a vertical illumination system. The light illuminating path is nearly symmetrical regarding the optical axis of the objective lens and is dissected into segments which intersect at a predetermined or arbitrary angle to the surface under examination from both sides thereof. The dissected image can be viewed in the same field, and the inspection is carried out with ease but yet with high accuracy.

3 Claims, 9 Drawing Figures

PATENTED OCT 22 1974 3,843,227
SHEET 1 OF 2

INVENTORS
JINICHI KATO
AND
KATSUJI RIKUKAWA
BY Harry G. Shapiro
ATTORNEY

LIGHT DISSECTING OPTICAL SYSTEM

This application is a Continuation of our pending application Ser. No. 6,436 filed Jan. 28, 1970, now abandoned.

BACKGROUND OF THE INVENTION

The present invention relates to an optical system and more particularly an optical system for light dissection for measurement or inspection of very fine projections and recesses upon a surface or surface roughness.

Two types of the light dissecting optical systems are known. One is a single barrel type in which only one objective is used for illumination and observation and the other, a biobjective barrel type in which two objectives are used for illumination and observation, respectively. In the former conventional type, the operation is very simple, however the objective is used only in the outer periphery thereof so that there are significant aberrations present thereby adversely affecting the accuracy in measurement. On the other hand in the biobjective type, a higher degree of accuracy in measurement may be ensured but the operation is rather difficult because the focusing of the illumination system and that of the observation system must be carried out independently of each other.

An object of the present invention is to provide an optical system for light dissection which can eliminate the defects and limitations encountered in the conventional systems and is simple in operation yet affords a higher degree of accuracy.

SUMMARY OF THE INVENTION

In brief, according to the present invention, in order to observe a surface to be examined, distinct light segments are directed to the surface at a predetermined angle by light reflecting members consisting of two pairs of mirrors or prisms which are disposed at the object side of the objective lens of a microscope having a vertical illumination system. The surface to be examined is intersected by the light in such a manner that the light passes through nearly symmetric light paths with respect to the optical axis of the one objective lens and intersects the surface under examination from both sides thereof at a predetermined angle, whereby the dissected images can be viewed in the same field.

Furthermore, in order to dissect light into segments which intersect the surface to be examined at an arbitrary angle, light reflecting members consisting of two pairs of mirrors or prisms are movably disposed at the object side of the objective lens of a microscope having a vertical illumination system similar to the optical system. With the movement of these mirrors or prisms, the surface to be examined is intersected by dissected light in such a manner that the light passes through nearly symmetrical light paths with respect to the optical axis of the one objective lens and intersects the surface under examination from both sides thereof at an arbitrary angle, whereby the optical system is constituted as to obtain the dissected image in the same field.

Because of the above described arrangement, the operation is very simple, and yet, a higher degree of accuracy is afforded. Furthermore, the reference surface of the body under examination may be set to its correct position, that is, the position at a right angle relative to the optical axis of the objective while the surface under examination is observed. The above and other objects, features and advantages of the present invention will become more apparent from the following description of illustrative embodiments thereof with reference to the accompanying drawing.

BRIEF DESCRIPTION OF THE DRAWING

FIG. 3A is a fragmentary side view thereof;

DESCRIPTION OF THE PREFERRED EMBODIMENT

Figure 1A:
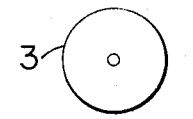
FIG. 1A is a plan view of the diaphragm member shown in FIG. 1.
Figure 1B:
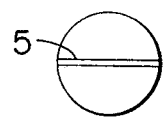
FIG. 1B is a plan view of the slit member shown in FIG. 1.
Figure 1:
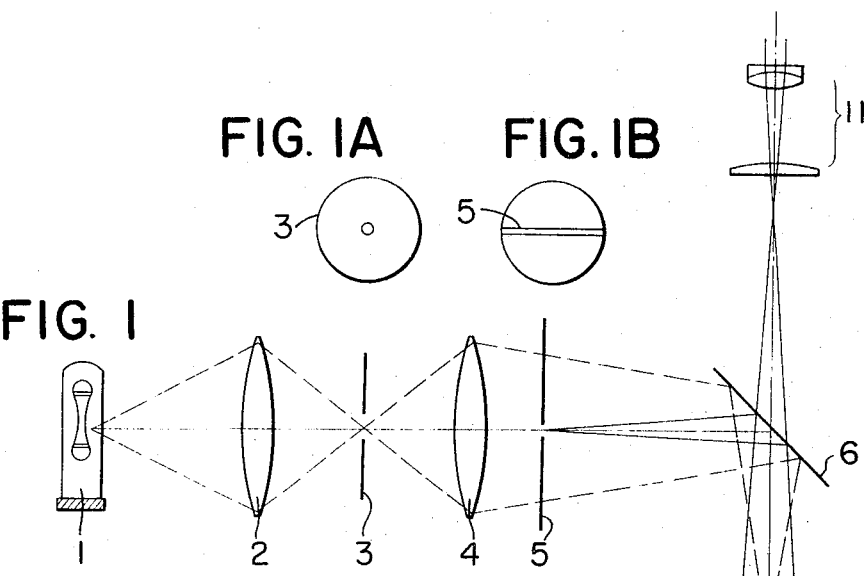
FIG. 1 is a schematic view illustrating one embodiment of an optical system in accordance with the present invention.

FIG. 1 shows an optical system of a single tube type in accordance with the present invention, in which one objective dissects the surface with the light and magnifies images. The light rays emitted from a lamp 1 illuminates the surface to be inspected 10 through an illumination system consisting of lenses 2 and 4, an objective 7 and reflecting members 6, 8 and 9 to be described in more detail hereinafter. Reference numeral 3 designates a variable aperture iris diaphragm; 5, a slit; and 6, a semi-transparent surface by which the light from the slit 5 is directed to the surface of specimen 10 through the objective lens 7 and through which the light rays from specimen 10 are led to an eyepiece 11. The reflecting members 8 and 9 are mirrors or prisms which are arranged to permit the illumination light coming through the slit 5 and the objective 7 to be dissected and intersect the surface 10 at an angle of $\theta$. The reflected light from the reflected surface is further reflected by the reflecting members 9 and 8 arranged in the opposed relation with the first reflecting members 8 and 9 so that the surface 10 may be observed through the objective 7 and the eyepiece 11.

The first intermediate image of the lamp 1 is formed on the aperture stop 3 through the first condenser lens 2, and the second intermediate image is formed between the semitransparent surface 6 and the objective lens 7 through the second condenser lens 4. The objective lens 7 is so arranged that the distance between the second image plane and the objective lens 7 may be equal to the focal length thereof. Therefore, any light radiated from the lamp 1 which is passed through condenser lenses 2 and 4 is reflected by the semitransparent surface 6 and is converted to parallel light rays through the objective lens 7, as shown by the dashed lines in FIG. 1. However, as shown by the solid lines in FIG. 1, slit member 5 cuts off all of the light from lamp 1 passing through condenser lens 4 except for the light passing through the slit. The light which passes through slit 5 is split into two segments by splitting reflector members 8 and these light segments are, respectively, projected toward the specimen through reflectors 9 so that the specimen is illuminated by the separate light segments. The brilliant image of the slit formed on the surface of the specimen 10 via the reflectors 8 and 9 is redirected by these reflectors upward through the semitransparent surface 6, and thus may be observed through the microscope optical system 7, 11.

Figure 3:
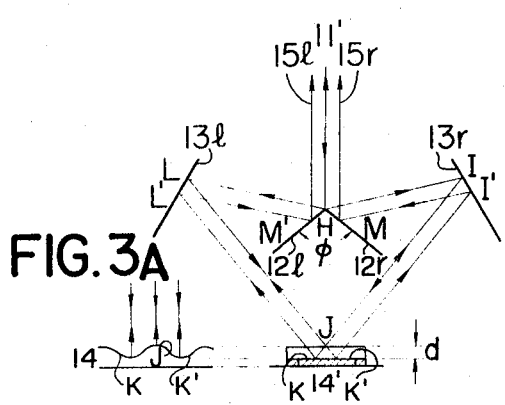
FIG. 3 is an enlarged, explanatory view of the principal part of the one embodiment of the present invention.
Figure 5:
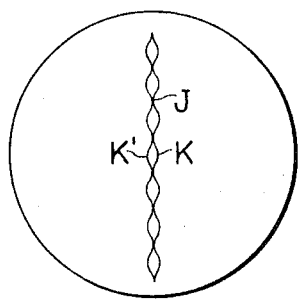
FIG. 5 is a view illustrating the field observed through an eyepiece or ocular when the optical axis of the objective lens is perpendicular to the reference surface of the surface under examination.
Figure 6:
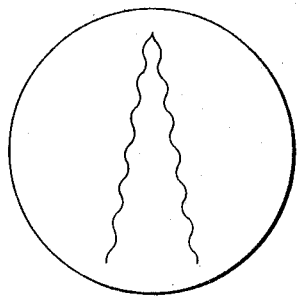
FIG. 6 is a view similar to FIG. 5 illustrating the field when the optical axis of the objective lens is not perpendicular to the reference surface of the surface under examination.

Next the observation of the surface having a surface roughness (or depth) $d$ will be described with reference to FIG. 3. FIG. 3 is an enlarged, explanatory view of the principal part of the one embodiment of the present invention. The incident light beams 11' are reflected to the right and left, by the mirrors 12-$l$ and 12-$r$ arranged at an angle of $\phi$ and then reflected again by the mirrors 13-$l$ and 13-$r$ so as to illuminate J-K' and J-K of the surface at a predetermined angle. Therefore, the reflected light rays from each point pass the optical paths JIH or K'I'M and JLH or KL'M' and become 15-$r$ and 15-$l$ or 11' so that the surface is observed through the objective and the eyepiece. In this case, the right and left light dissected image are observed in the same field as shown in FIG. 5. When the surface roughness, that is the hills and valleys are symmetrical, the symmetrical light-dissected images will be formed in the field, and a degree of accuracy by measurement will be improved in two fold. When the hills and valleys are not symmetrical, the images are not symmetrical so that the deformations of the hills and valleys may be observed. In the inspection, the optical axis of the objective must be at a right angle relative to the reference surface of the surface under examination in order to improve the accuracy in measurement. When this requirement is not met with, the images as shown in FIG. 6 are observed in the field so that the observer may readily recognize the error and set the reference surface at the correct position while viewing the images in the field.

Figure 2:
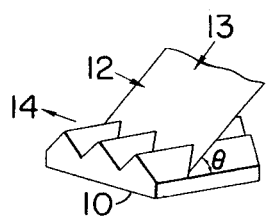
FIG. 2 is an enlarged, perspective view illustrating the relationship between a surface under examination and a dissected segment of light.

In order to increase the accuracy of measurement by the light dissecting method, consideration is given to increasing the magnification. Referring to FIG. 2, illustrating the relationship between the surface under examination and the dissected light, reference numeral 12 designates a light band or segment; 13, the direction of the incident light; and 14, the direction of the reflected light. When the incident angle is $\theta°$, the surface under examination having a surface roughness (or depth) of $d$ is observed with the magnification of $(2 \cos \theta) \times (Mt) \times (d)$, where $Mt$ is an overall magnification of the objective and the ocular of the microscope. When the overall magnifying power is increased by increasing that of the objective, the depth of focus will be shortened so that the improvement of the accuracy in measurement is adversely effected. Therefore, it is useless to increase the magnifying power beyond a certain power. Instead, it is desired to increase the value of cos $\theta$ and consequently to decrease angle $\theta$ in order to increase the magnifying power.

Figure 4:
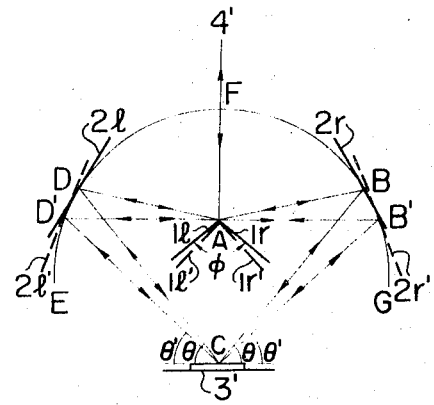
FIG. 4 is a view similar to FIG. 3 illustrating another embodiment of the present invention.

FIG. 4 illustrates another embodiment of the present invention based upon the above described principle. The incident light 4' is reflected by the mirror 1-$l$ and 1-$r$ arranged at an angle of $\phi$ and the mirror 2-$l$ and 2-$r$ so that the light is made incident upon the surface under examination 3' at an angle of $\theta°$ from both sides thereof, thereby dissecting the surface 3'. Thereafter, the light is reflected again by the said mirrors 2-$l$ and 1-$l$ and 2-$r$ and 1-$r$ arranged in the opposed position and returns to the objective. The incident light 4' is reflected at the point A, which is the intersecting point of the mirrors 1-$r$ and 1-$l$. Part of the light is reflected again at the point B, upon the mirror 2-$r$, and then is made incident upon the surface 3' under examination at the point C, at the angle of $\theta°$. The other part of the incident light 4' is reflected at the point A of the mirror 1-$l$ to the point D upon the mirror 2-$l$ and is made incident at the point C upon the surface 3' under examination, at an angle of $\theta°$.

An ellipse EFG, including points B and B', D and D', is constructed with the points A and C being the two foci. The mirrors 2-$l$ and 2-$r$ are symmetrical with respect the optical axis; therefore, $AB + BC = AD + DC = AB' + B'C = AD' + D'C$ = constant.

When the mirrors 2-$r$ and 2-$l$ are displaced to for example the positions indicated by 2-$r'$ and 2-$l'$, which are tangent to the ellipse, and when the mirrors 1-$r$ and 1-$l$ are rotated about point A to the positions 1-$r'$ and 1-$l'$ so that the reflected light of the incident light 4' is directed toward the points of tangency B' and D' of the mirrors 2-$r$ and 2-$l$, then the surface under examination will be intersected by incident light of an arbitrary angle of $\theta'°$. When the angle $\theta'$ is selected to be small, the accuracy in measurement can be increased.

The mirrors 1-$r$, 1-$l$, 2-$r$ and 2-$l$ may be rotated and displaced in unison. Any other reflective surfaces, such as may be prisms, which may be rotated and displaced in unison would also function effectively in the invention.

The present invention has been so far described with particular reference to the illustrative embodiments thereof, but it will be understood that variations and modifications can be effected without departing the true spirit of the present invention as described hereinabove and as defined in the appended claims.

We claim:

1. A light dissecting optical system for examining a specimen comprising a main optical system positioned along a principal optical axis, including an objective, an eyepiece, and a semitransparent reflecting surface between the objective and the eyepiece disposed obliquely to the principal optical axis; an illuminating optical system including a light source and a condenser lens system having an iris variable diaphragm therein positioned along a second optical axis, the principal optical axis and the second optical axis intersecting each other at the semitransparent reflecting surface to direct light along the principal optical axis; a plate having a light entrance slit and disposed between said condenser lens system and said semitransparent reflecting mirror, the center of said light entrance slit being positioned on the second optical axis; a first set of reflecting surfaces and a second set of reflecting surfaces disposed on the object side of the objective, each set of reflecting surfaces being symmetrical about the principal optical axis, the first and second sets coacting to dissect the light and direct the dissected segments of light to the surface of a specimen, and further coacting to direct the light segments reflected from the surface of a specimen to the eyepiece through the objective and the semitransparent reflecting surface.

2. A light dissecting optical system according to claim 1, wherein each reflecting surface of the second set of reflecting surfaces is movable along an elliptical path, the elliptical path having one foci positioned at a point on the principal optical axis where a specimen is to be placed for observation, and the other foci positioned at the intersecting edges of the first set of reflecting surfaces.

3. A light dissecting optical system according to claim 1, wherein each reflecting surface of the first set of reflecting surfaces intersects each other on the principal axis; and each reflecting surface of the second set of reflecting surfaces faces the location at which a specimen is to be positioned for viewing, and is movable along an elliptical path, the elliptical path having one foci positioned at a point on the principal optical axis where the specimen is to be placed, and the other foci positioned at the intersecting edges of the first set of reflecting surfaces.

* * * * *